United States Patent
Sato et al.

(10) Patent No.: US 8,720,465 B2
(45) Date of Patent: May 13, 2014

(54) DEVICE FOR WORK IMPLEMENTATION WITHOUT STOPPING FLOW, AND METHOD FOR WORK IMPLEMENTATION WITHOUT STOPPING FLOW

(75) Inventors: Toshiyuki Sato, Shiga (JP); Taihei Yokoyama, Shiga (JP)

(73) Assignee: Suiken Co., Ltd., Shiga (JP)

( * ) Notice: Subject to any disclaimer, the term of this patent is extended or adjusted under 35 U.S.C. 154(b) by 167 days.

(21) Appl. No.: 13/510,335

(22) PCT Filed: Feb. 1, 2011

(86) PCT No.: PCT/JP2011/051990
§ 371 (c)(1),
(2), (4) Date: May 17, 2012

(87) PCT Pub. No.: WO2011/099398
PCT Pub. Date: Aug. 18, 2011

(65) Prior Publication Data
US 2012/0222753 A1    Sep. 6, 2012

(30) Foreign Application Priority Data
Feb. 9, 2010 (JP) .................................. 2010-026328

(51) Int. Cl.
*B23B 41/08* (2006.01)
(52) U.S. Cl.
USPC .......................... 137/15.14; 137/318; 137/319
(58) Field of Classification Search
CPC ........... F16L 41/04; F16L 41/06; F16L 41/16; F16L 41/18; F16L 47/34; F16L 41/345
USPC .......... 137/317, 318, 319, 15.12, 15.13, 15.14
See application file for complete search history.

(56) References Cited

U.S. PATENT DOCUMENTS

| 435,548 A | * | 9/1890 | Smiley, Jr. | .................. 137/15.14 |
| 1,191,887 A | * | 7/1916 | Glauber | ........................ 277/626 |

(Continued)

FOREIGN PATENT DOCUMENTS

| JP | 2000-179779 A | 6/2000 |
| JP | 2001-173872 A | 6/2001 |

(Continued)

OTHER PUBLICATIONS

International Search Report for corresponding International Application No. PCT/JP2011/051990 mailed Mar. 29, 2011.

*Primary Examiner* — Elizabeth Houston
*Assistant Examiner* — Ian Paquette
(74) *Attorney, Agent, or Firm* — Renner, Otto, Boisselle & Sklar, LLP

(57) ABSTRACT

An apparatus including: a sealing case 20 having a branch-shaped branch hole 23 formed in a first separate case 21 and extending in the radial direction C of an existing pipe 1; and a rubber packing 30 for sealing a gap between the sealing case 20 and the existing pipe 1, wherein: the first separate case 21 is provided with a flange 28 for allowing for attachment and removal of a boring machine 3; the sealing case 20 is capable of reciprocating in the pipe axis direction L; and the rubber packing 30 forms: a first sealed area S1 surrounding a portion of the sealing case 20 where the branch hole 23 is provided for shutting the branch hole 23; and a second sealed area S2 being adjacent to the first sealed area S1, sealed against the first sealed area S1, displaced from the first sealed area S1 in the pipe axis direction L, and sized so as to be able to shut the opening bored by a cutter 3*a*.

1 Claim, 8 Drawing Sheets

(56) References Cited

U.S. PATENT DOCUMENTS

| | | | |
|---|---|---|---|
| 3,948,282 A * | 4/1976 | Yano | 137/15.17 |
| 5,170,813 A * | 12/1992 | Francis | 137/15.13 |
| 5,620,020 A * | 4/1997 | Collins | 137/318 |
| 6,615,859 B2 * | 9/2003 | Sato et al. | 137/15.14 |
| 6,622,747 B2 * | 9/2003 | Sato et al. | 137/15.09 |
| 6,776,184 B1 | 8/2004 | Maichel et al. | |
| 2001/0017159 A1 | 8/2001 | Sato et al. | |

FOREIGN PATENT DOCUMENTS

| | | |
|---|---|---|
| JP | 2001-330189 A | 11/2001 |
| JP | 2004-069059 A | 3/2004 |

* cited by examiner

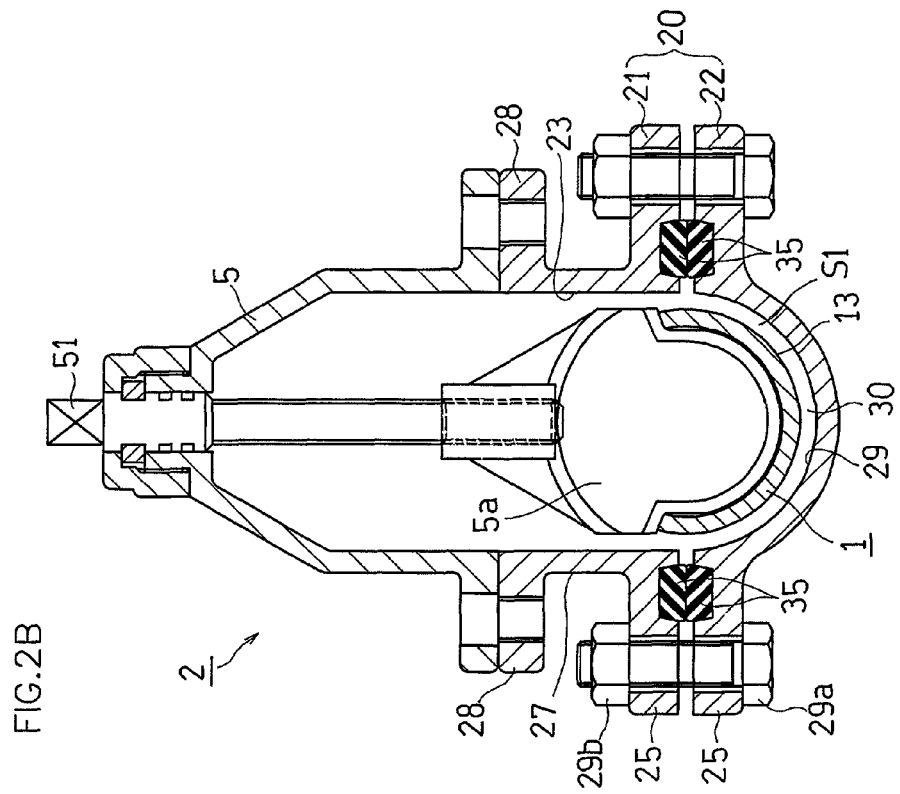
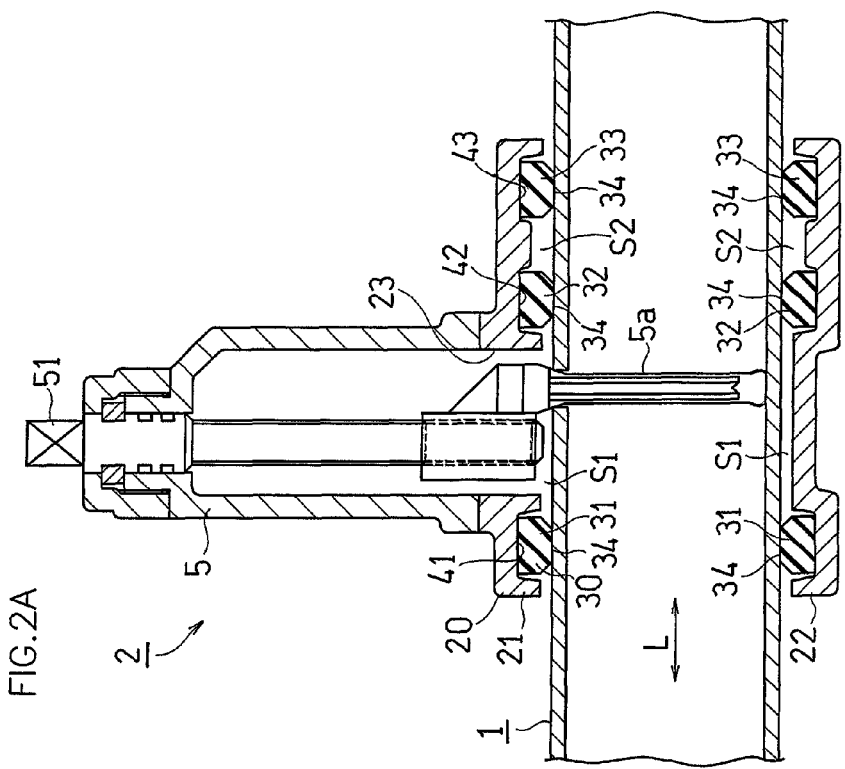

DEVICE FOR WORK IMPLEMENTATION WITHOUT STOPPING FLOW, AND METHOD FOR WORK IMPLEMENTATION WITHOUT STOPPING FLOW

TECHNICAL FIELD

The present invention relates to a device for work implementation without stopping flow and method for work implementation without stopping flow, that is, relates to a flow-undisrupted apparatus and a flow-undisrupted process.

BACKGROUND ART

There are conventional processes well known in the art, in which an opening is formed to insert a valve body into the line of the existing pipe, without disrupting the flow of a fluid through an existing pipe (see first and second patent documents).

CITATION LIST

Patent Document

[FIRST PATENT DOCUMENT] Japanese Laid-Open Patent Publication No. 2000-179779 (Abstract)
[SECOND PATENT DOCUMENT] Japanese Laid-Open Patent Publication No. 2004-69059 (Abstract)

A conventional separate case disclosed in the first and second patent documents includes a first flange to which a cutting tool including a cutter, or the like, is attached, and a second flange to which a valve cover accommodating a valve body therein is attached, provided separately from each other in the pipe axis direction of the existing pipe.

The inside of the separate case is sealed, and after the existing pipe is bored with the cutter, the separate case is moved by a predetermined amount in the pipe axis direction of the existing pipe, and a valve body is inserted into the bored opening.

SUMMARY OF THE INVENTION

With the conventional separate case, since the first flange to which the cutter is attached and the second flange to which the valve cover is attached communicate with each other through the inside of the separate case, when the existing pipe is bored with the cutter, the water pressure in the existing pipe is exerted entirely across the inside of the case including the valve cover.

Therefore, it is necessary to provide an operation valve for removing the cutter.

Since an attachment area for the cutter and an attachment area for the valve cover need to be formed in the case, the structure is complicated and it is difficult to reduce the size.

Thus, a primary object of the present invention is to provide a flow-undisrupted apparatus allowing for simple and easy operations and allowing for a reduction in size.

In order to achieve the object set forth above, a flow-undisrupted apparatus of the present invention is a flow-undisrupted apparatus to which a boring machine including a cutter (cutting tool) for boring a portion of a pipe wall of an existing pipe to form an opening in the pipe wall is attached, the flow-undisrupted apparatus allowing the boring machine to be removed therefrom after the opening is formed, the flow-undisrupted apparatus including: a sealing case including a plurality of separate cases separated from one another in a circumferential direction of the existing pipe for enclosing a portion of the existing pipe, and a branch-shaped branch pipe portion formed in a first separate case of the plurality of separate cases and having a branch hole extending in a radial direction of the existing pipe; and a rubber packing for sealing a gap between the sealing case and the existing pipe, wherein: the branch pipe portion of the first separate case is provided with a flange for allowing for attachment and removal of the boring machine; the sealing case is capable of reciprocating in the pipe axis direction of the existing pipe; and the rubber packing forms: a first sealed area surrounding a portion of the sealing case where the branch hole is provided for sealing a gap (included in the gap aforementioned) between the sealing case and the existing pipe around the branch hole; and a second sealed area for temporarily shutting the opening bored by the cutter, the second sealed area being adjacent to the first sealed area, sealed against the first sealed area, and displaced from the first sealed area in the pipe axis direction.

In the present invention, the apparatus further includes: a gate valve body for being intruded into an inside of the existing pipe through the opening formed in the pipe wall so as to disrupt a flow of a fluid through the existing pipe; and a valve cover accommodating the gate valve body therein, the valve cover being coupled to the first separate case via the flange instead of the boring machine.

In the present invention, the first and second sealed areas are provided, which do not communicate with each other. That is, the first sealed area and the second sealed area are sealed against each other so as not to communicate with each other. Therefore, when the existing pipe is bored with the cutter, the water pressure in the pipeline of the existing pipe is exerted on the first sealed area and is not exerted on the second sealed area. On the other hand, when the present apparatus is moved in the pipe axis direction, the water pressure in the pipeline is exerted on the second sealed area and is not exerted on the first sealed area.

By shutting the bored opening in the second sealed area, it is no longer necessary to additionally use an operation valve, allowing for a significant cost reduction.

It is possible to attach various devices such as boring machines and valve covers, branch pipes, etc., to the flange provided on the first separate case. Therefore, it is no longer necessary to provide two flanges, as opposed to conventional techniques, thereby simplifying the structure and allowing for a reduction in size of the apparatus.

Moreover, where the present apparatus is used on an existing pipe having a small diameter of about 40φ to about 75φ, the nominal diameter of the bolt for securing the flange to the boring machine or the valve cover will be large for the present apparatus. However, it is not needed to install bolts in two flanges, as opposed to conventional techniques, but it is only needed to use bolts on a single flange. This prevents the assembly from becoming complicated due to adjacent bolts being close to each other.

Now, where the present apparatus is used on a water pipe, a level of durability on the order of 50 to 100 years is required. Therefore, it is necessary to use bolts and nuts of expensive stainless steel. With the present apparatus, it is only needed to attach bolts and nuts on a single flange. Therefore, the number of bolts is small, as opposed to conventional techniques. As a result, it is possible to significantly reduce the cost.

On the other hand, a flow-undisrupted process of the present invention is a flow-undisrupted process including an assembly step, a boring step, a first movement step, a replacement step, and a second movement step, wherein: the assembly step is a step of airtightly enclosing the portion of the existing pipe by the sealing case and attaching the boring machine to the flange of the first separate case without providing an operation valve; the boring step is a step in which the cutter passes through the branch hole to form the opening in the portion of the existing pipe; the first movement step is a step of moving the sealing case in a first direction of the pipe axis direction after the boring step so that the first sealed area does not cover the opening while the second sealed area covers the opening; the replacement step is a step of removing the boring machine from the flange together with the cutter after the first movement step, and attaching a valve cover accommodating the gate valve body therein to the flange instead of the boring machine; and the second movement step is a step of moving the sealing case in a second direction, opposite to the first direction, after the replacement step to such a position that the gate valve body can be intruded into the opening.

With such a flow-undisrupted process, in the first movement step, the sealing case can be moved in the first direction so as to shut the opening bored by the cutter by the second sealed area. Therefore, in the replacement step, it is possible to remove the boring machine having the cutter, and attach the valve cover accommodating the valve body therein instead of the boring machine.

Then, in the second movement step, the sealing case can be moved in the second direction opposite to the first direction so as to insert the gate valve body into the existing pipe through the opening.

Thus, it is possible to insert a gate valve body with advantages set forth above, as compared with a case in which an operation valve is additionally used.

BRIEF DESCRIPTION OF THE DRAWINGS

FIG. 2A is a schematic vertical cross-sectional view of the flow-undisrupted apparatus showing a state where a valve cover is attached to the flange, and FIG. 2B is a horizontal cross-sectional view thereof.

MODE FOR CARRYING OUT THE INVENTION

In the present invention, it is preferred that a first portion of the rubber packing forming the first sealed area is formed in a lattice pattern having a through hole through which the cutter passes; and a second portion of the rubber packing forming the second sealed area is formed in a cylindrical shape covering an entire surface of a portion of the existing pipe corresponding to the second sealed area and an entirety of the opening.

In this embodiment, while the packing of the second portion moves over the opening when the sealing case is moved in the pipe axis direction, it is unlikely that the second portion, which is a cylindrical shape and is continuous in the pipe axis direction, gets caught in the opening to become "turned up".

In the present invention, it is preferred that the second portion of the rubber packing includes a pair of ridge portions extending in a circumferential direction of the existing pipe, and a connecting portion connecting between the pair of ridge portions and having a greater inner diameter than the ridge portions, wherein an inner periphery surface of the rubber packing, which faces an outer periphery surface of the existing pipe, protrudes toward the existing pipe along ridge portions.

In this embodiment, the second portion is formed in a waffle pattern including a pair of ridge portions. Therefore, the contact pressure between the connecting portion and the existing pipe is small. This makes the movement in the pipe axis direction easier.

Embodiment 1

Embodiments of the present invention will now be described with reference to the drawings.

FIGS. 1A to 6D show Embodiment 1.

First, a general configuration of the present apparatus will be described.

Flow-Undisrupted Apparatus 2:

The present apparatus 2 shown in FIGS. 1 and 2 encloses (surrounds) an existing pipe 1 while a fluid (e.g., water, etc.) is flowing through the existing pipe 1, and is moved in a pipe axis direction L as shown in FIGS. 5A to 6D, for flow-undisrupted boring and for insertion/removal of a valve body, etc.

Figure 1B:
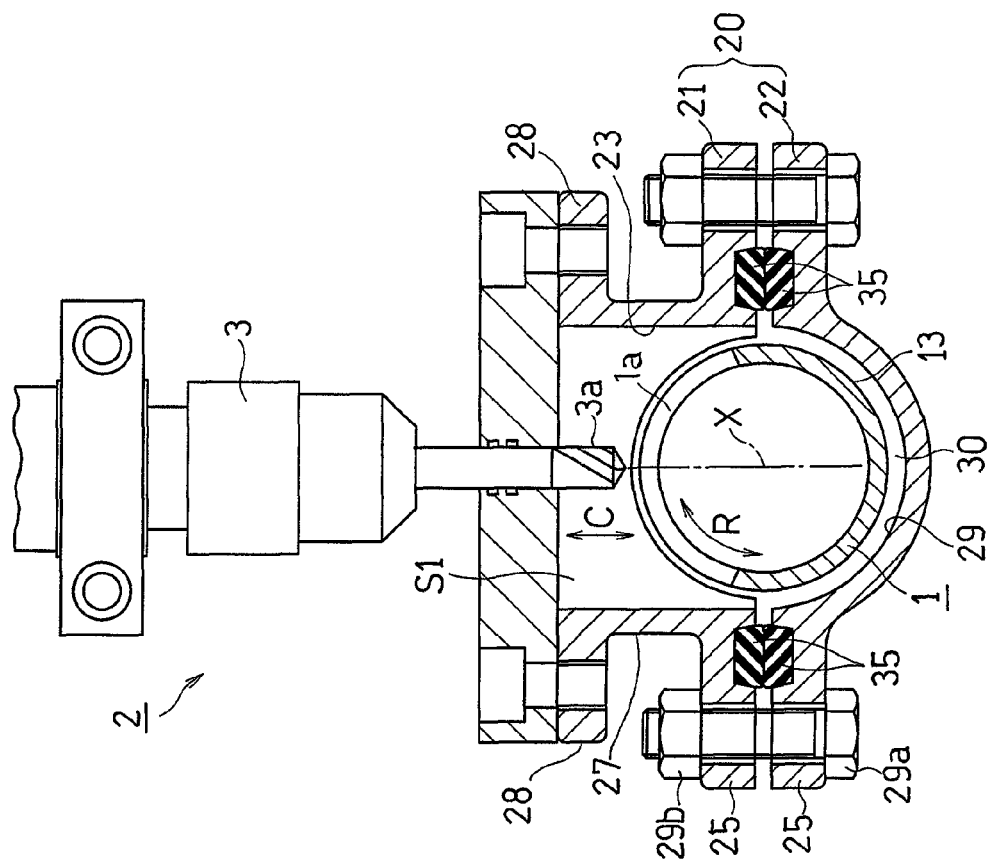
FIG. 1B is a horizontal cross-sectional view thereof.

Separate Cases 21 and 22:

As shown in FIG. 1B, the present apparatus 2 includes a sealing case 20. The sealing case 20 includes two separate cases 21 and 22 enclosing a portion of the existing pipe 1.

The first and second separate cases 21 and 22 are separated from each other along a virtual plane that is generally orthogonal to the axis X of a branch pipe portion 27. The pair of separate cases 21 and 22 are attached from outside to the existing pipe 1 from the upper and lower sides in the radial direction C of the existing pipe 1 and are assembled together by fastening coupling portions 25 thereof to each other with assembly bolts 29a and assembly nuts 29b.

Figure 1A:
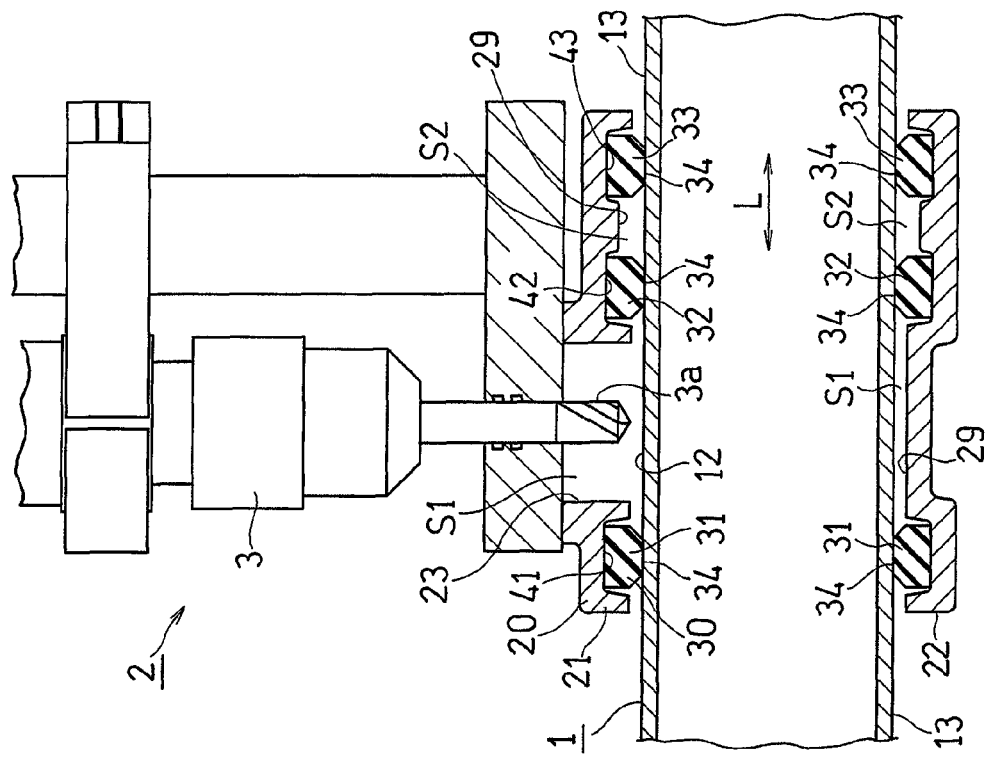
FIG. 1A is a schematic vertical cross-sectional view of a flow-undisrupted apparatus according to Embodiment 1 of the present invention showing a state where a boring machine is attached to a flange.

As shown in FIG. 1A, the separate cases 21 and 22 each have an inner periphery surface 29 which is curved generally along an outer periphery surface 13 of the existing pipe 1.

The branch pipe portion 27 having a branch-shaped branch hole 23 protruding in the radial direction C of the existing pipe 1 is formed integral with the first separate case 21 of the plurality of separate cases 21 and 22 shown in FIG. 1B.

Branch Pipe Portion 27:

A flange 28, e.g., a plate-shaped flange, is formed integral with the branch pipe portion 27, and a boring machine 3 shown in FIG. 1B, a valve cover 5 shown in FIG. 2B, etc., are attached to the flange 28.

Figure 3A:
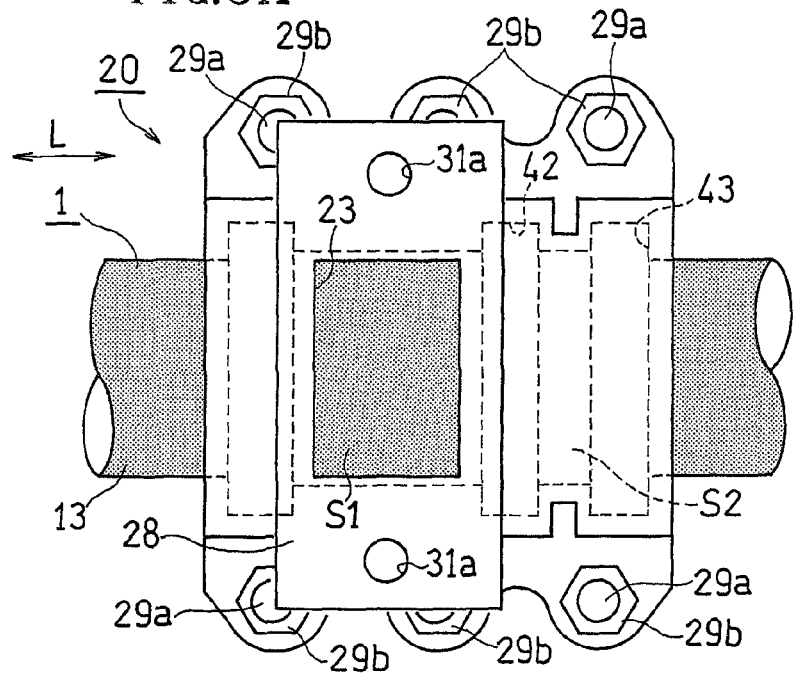
FIG. 3A is a schematic plan view showing a state where a sealing case is attached to an existing pipe.
Figure 4A:
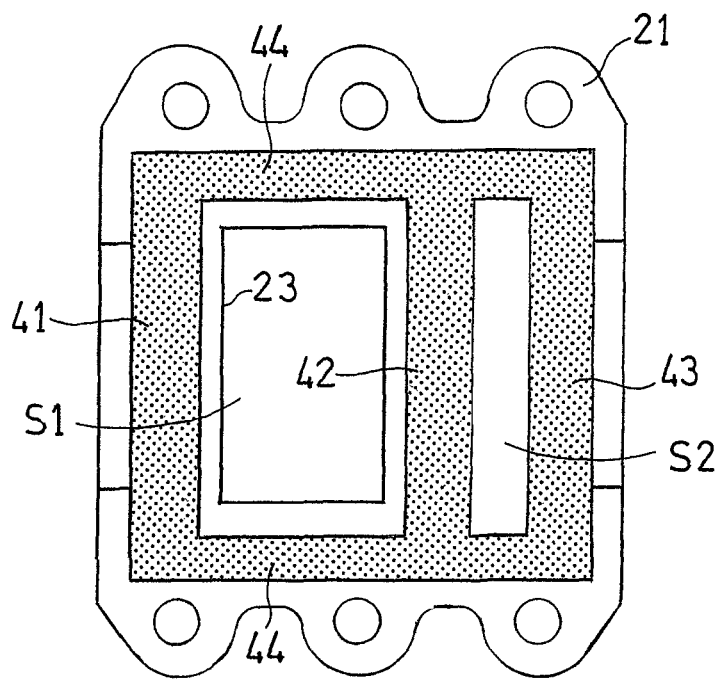
FIG. 4A is a schematic bottom view of a first separate case.
Figure 4B:
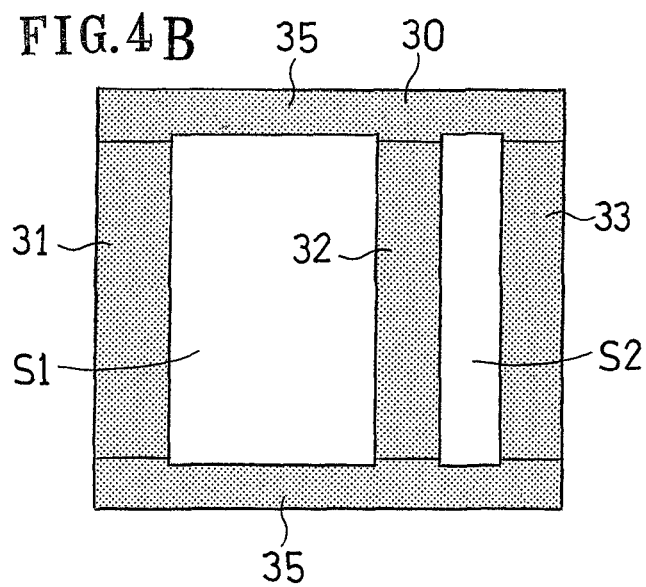
FIG. 4B is a schematic bottom view of a rubber packing.
Figure 4C:
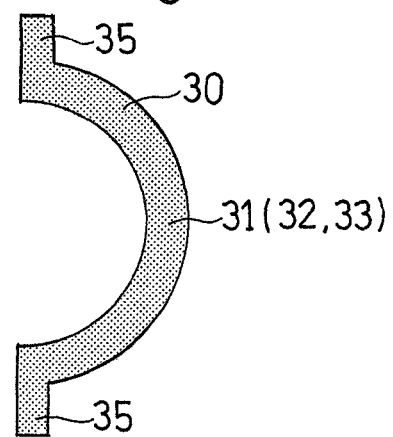
FIG. 4C is a schematic side view of the rubber packing.

Rubber Packing 30:

In FIG. 3A, areas corresponding to the existing pipe 1 are densely dotted. In FIG. 4A, packing attachment portions 41 to 44 of the separate case 21 (22) are sparsely dotted. In FIGS. 4B and 4C, a rubber packing 30 is densely dotted.

As shown in FIG. 4A, the packing attachment portions 41 to 44 formed by grooves in a lattice pattern are formed on the inner surface of the separate case 21 (22). The rubber packing 30 shown in FIG. 3B is attached to the packing attachment portions 41 to 44, and the gap between the existing pipe 1 and the sealing case 20 is sealed by the rubber packing 30 as shown in FIG. 1A.

Figure 3B:
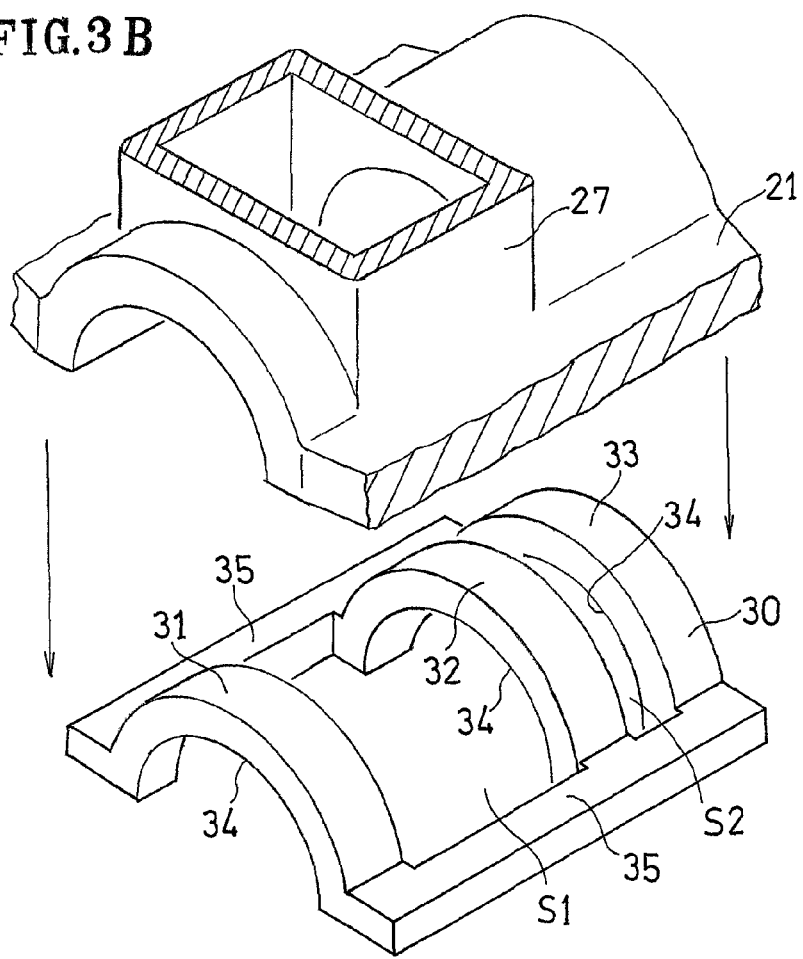
FIG. 3B is an exploded perspective view showing a partially-cutaway first separate case and a rubber packing.

As shown in FIGS. 3B and 4B, the rubber packing 30 includes first to third seal rings 31 to 33, which are half ring-shaped, and two straight portions 35 and 35, which are straight-shaped.

As shown in FIG. 4A, the separate case 21 (22) includes first to third depressed portions 41 to 43 and fourth depressed portions 44 and 44 in which the first to third seal rings 31 to 33 and the straight portions 35 and 35, respectively, fit.

As shown in FIGS. 4C and 3B, the first to third seal rings 31 to 33 each have an inner periphery surface 34 formed in a semi-circular shape so as to closely contact the outer periphery surface 13 of the existing pipe 1. The fourth depressed portions are formed in a straight shape so that the straight portions 35 fit therein, and so that when the separate case 21 (22) is attached to the existing pipe 1, the straight portions 35 closely contact each other with the straight portion 35 of the separate case 22 (21).

First Sealed Area S1:

As shown in FIG. 1A, the first seal ring 31 and the second seal ring 32 are arranged on opposite sides of the branch hole 23 in the pipe axis direction L. Thus, a first sealed area S1, which surrounds and seals a portion of the sealing case 20 in which the branch hole 23 is provided, is formed between the first seal ring 31 and the second seal ring 32. That is, the first sealed area S1, which shuts the branch hole 23, is formed in a portion corresponding to the branch hole 23.

Second Sealed Area S2:

As shown in FIG. 4B, a second sealed area S2 is formed between the second seal ring 32 and the third seal ring 33. That is, as shown in FIG. 1A, the second sealed area S2 is adjacent to the first sealed area S1 and is sealed against the first sealed area S1. The second sealed area S2 is formed to be displaced from the first sealed area S1 in the pipe axis direction L, and sized so as to be able to shut an opening 1a bored with the cutter 3a (FIG. 1A) shown in FIG. 5E.

The sealed areas S1 and S2 are sealed spaces, and the sealed areas S1 and S2 do not communicate with each other.

As shown in FIG. 1B, the straight portions 35 and 35 are provided so as to oppose each other between the coupling portion 25 of the first separate case 21 and the coupling portion 25 of the second separate case 22.

Flow-Undisrupted Process:

Assembly Step:

First, as shown in FIGS. 1A and 1B, a portion of the existing pipe 1 is airtightly enclosed by the sealing case 20, and the boring machine 3 is attached to the first separate case 21 via the flange 28.

That is, as the existing pipe 1 is sandwiched and enclosed from the upper and lower sides by the first separate case 21 and the second separate case 22, the inner periphery surfaces 34 of the first to third seal rings 31 to 33 of the rubber packing 30 come into contact with a pipe wall 12 (the outer periphery surface 13) of the existing pipe 1, thereby forming the first sealed area S1 and the second sealed area S2 as shown in FIG. 1A.

Then, the bolt 29a is passed through the coupling portions 25 of the separate cases 21 and 22 shown in FIG. 1B, and the nut 29b is screwed onto the bolt 29a, thereby airtightly enclosing a portion of the existing pipe 1 with the sealing case 20.

Figure 5A:
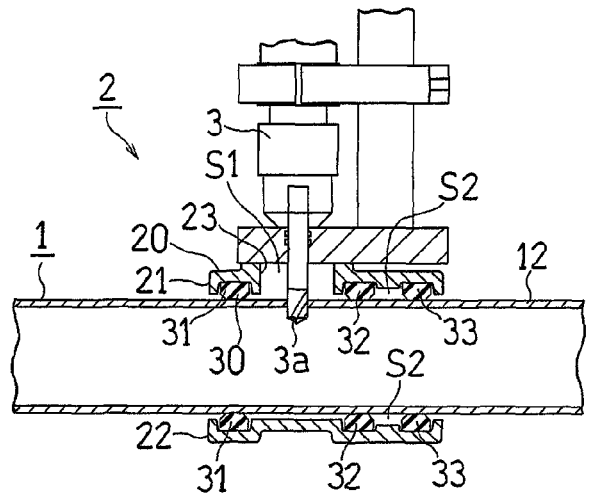
FIGS. 5A, 5B, 5C, 5D, 5E and 5F are schematic cross-sectional views showing a flow-undisrupted process.
Figure 5B:
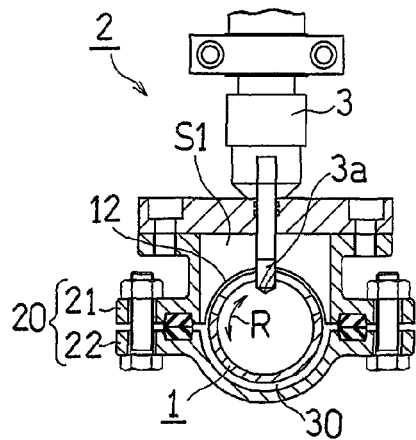
Figure 5C:
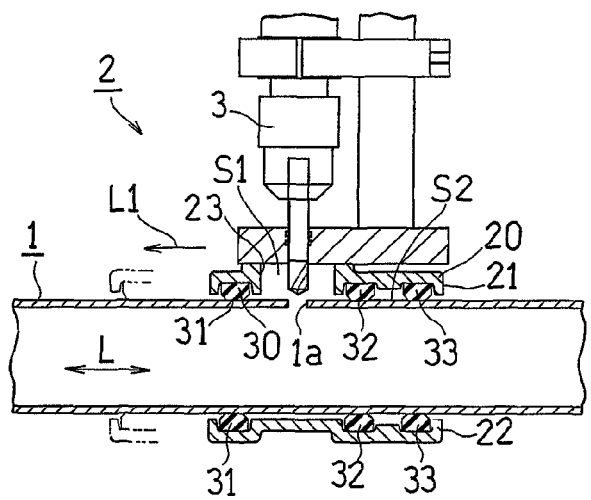
Figure 5D:
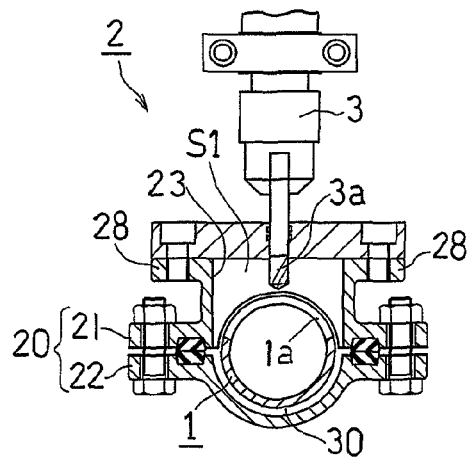

Boring Step:

Then, as shown in FIGS. 5A and 5B, the cutter 3a of the boring machine 3 is moved (lowered) toward the center of the existing pipe 1 so as to bore a portion of the pipe wall 12 of the existing pipe 1 with the cutter 3a of the boring machine 3, and the entire present apparatus 2 is rotated in the circumferential direction R while spinning the cutter 3a of the boring machine 3 so as to bore a portion of the existing pipe 1 and form the opening 1a extending generally halfway round as shown in FIGS. 5C and 5D.

First Movement Step:

Then, the boring machine 3 is returned to the original position, and the sealing case 20 is slid in the first direction L1 to the position indicated by a two-dot-chain line of FIG. 5C. That is, the sealing case 20 is moved so that the opening 1a is not covered by the first sealed area S1 but the opening 1a is covered by the second sealed area S2 as shown in FIG. 5E.

Figure 5E:
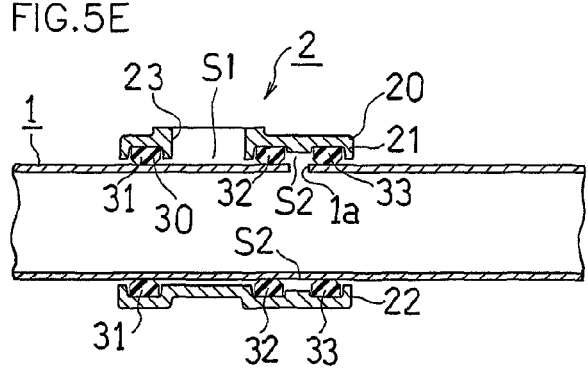
Figure 5F:
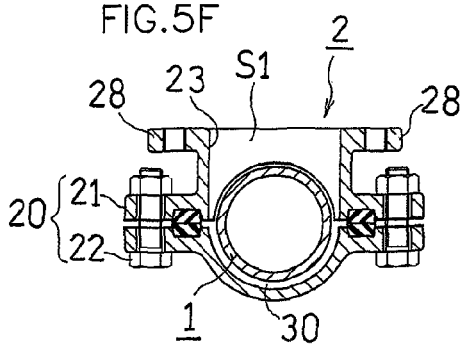

Replacement Step:

As shown in FIGS. 5E and 5F, the boring machine 3 is removed from the sealing case 20, together with the cutter 3a, after the first movement step.

Herein, the opening 1a is sealed by the second sealed area S2 by the first movement step. Therefore, water flowing through the pipeline of the existing pipe 1 will not gush out of the opening 1a.

Figure 6A:
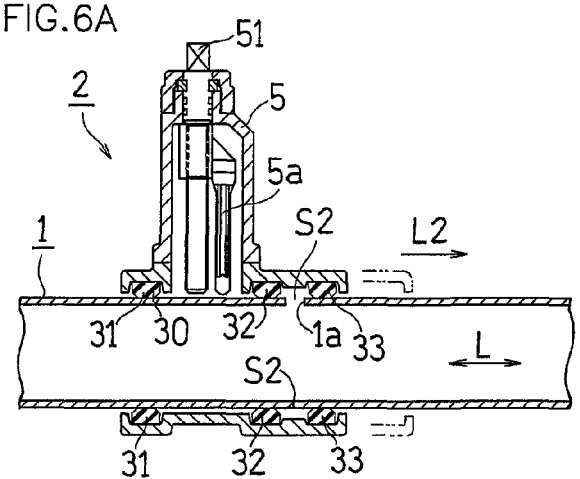
FIGS. 6A, 6B, 6C and 6D are schematic cross-sectional views showing the flow-undisrupted process.
Figure 6B:
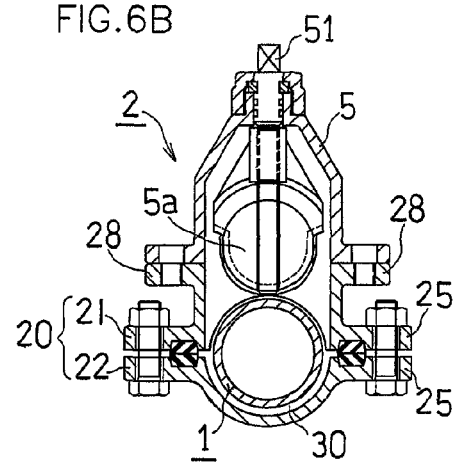

After the boring machine 3 is removed, the valve cover 5 is attached to the flange 28 of the first separate case 21 as shown in FIGS. 6A and 6B. A valve body 5a capable of being intruded into the existing pipe 1 is provided in the valve cover 5.

Second Movement Step:

Then, the sealing case 20 is slid in the second direction L2, opposite to the first direction L1, as indicated by a two-dot-chain line of FIG. 6A. Through the second movement step, the sealing case 20 is moved to such a position that the gate valve body 5a can be intruded into the existing pipe 1 through the opening 1a as shown in FIGS. 6C and 6D.

Water-Disrupting Step:

Then, when an operation portion 51 of the valve cover 5 is rotated, the gate valve body 5a descends, thereby shutting the pipeline of the existing pipe 1 and disrupting water as shown in FIGS. 2A and 2B. After the water disruption, work is performed downstream of the existing pipe 1.

Figure 6C:
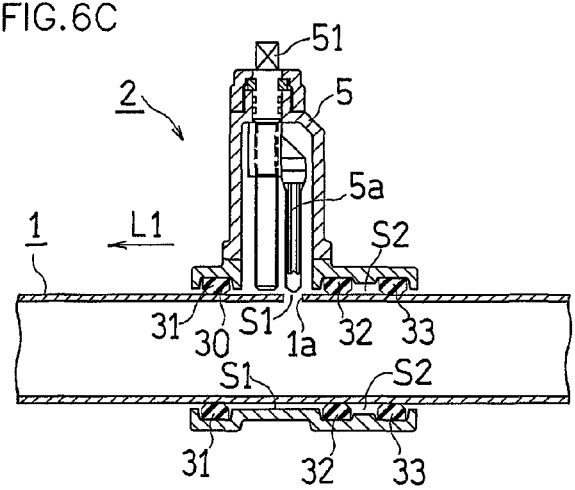
Figure 6D:
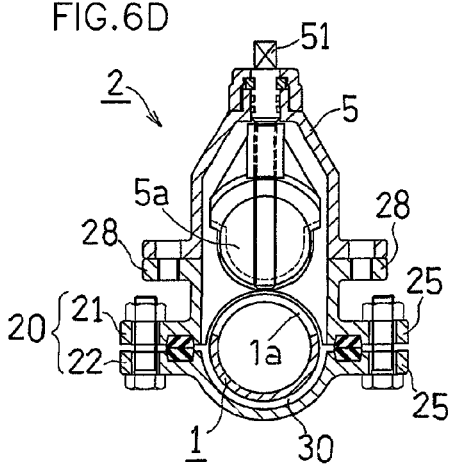

Then, as the operation portion 51 of the valve cover 5 is rotated in the reverse direction, the gate valve body 5a ascends as shown in FIGS. 6C and 6D.

Where the valve cover 5 and the gate valve body 5a are no longer needed, the sealing case 20 is slid again in the first direction L1 after the gate valve body 5a is ascended.

After the movement, the first sealed area S1 does not cover the opening 1a, with the second sealed area S2 surrounding the opening 1a, as shown in FIGS. 6A and 6B.

After the movement, the valve cover 5 is removed from the sealing case 20 together with the gate valve body 5a.

Embodiment 2

Figure 7A:
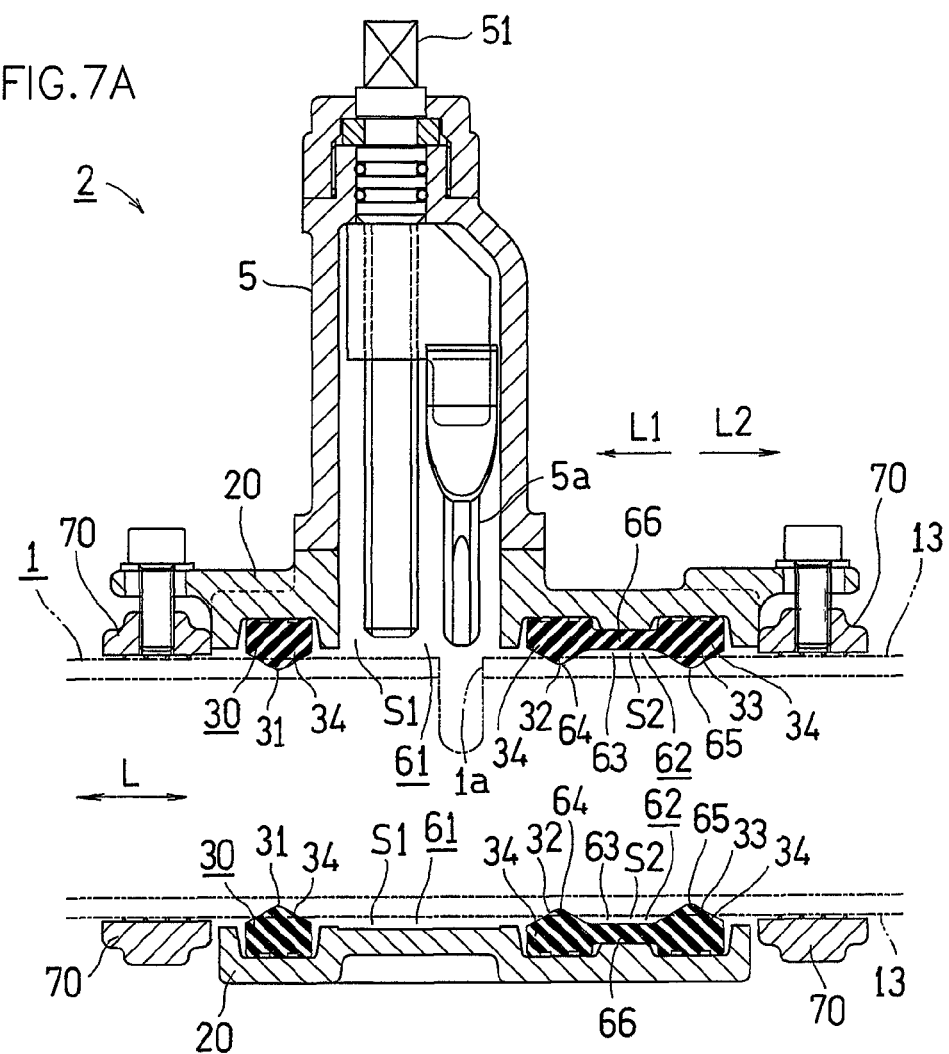
FIG. 7A is a schematic vertical cross-sectional view of a flow-undisrupted apparatus according to Embodiment 2 of the present invention showing a state where a valve cover is attached.
Figure 8A:
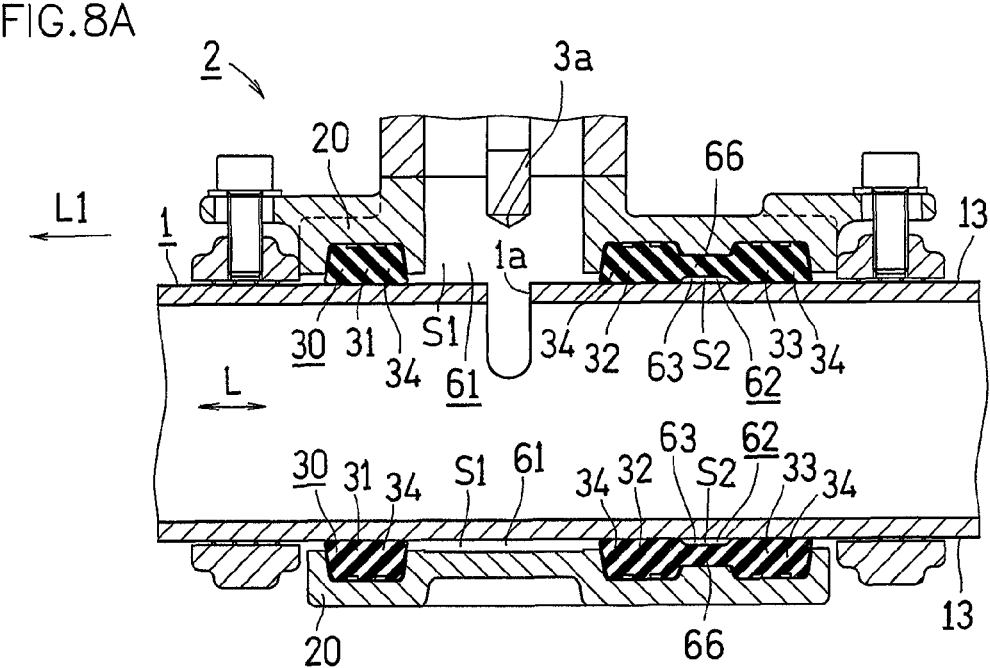
FIGS. 8A and 8B are schematic cross-sectional views showing a method for moving the apparatus.
Figure 8B:
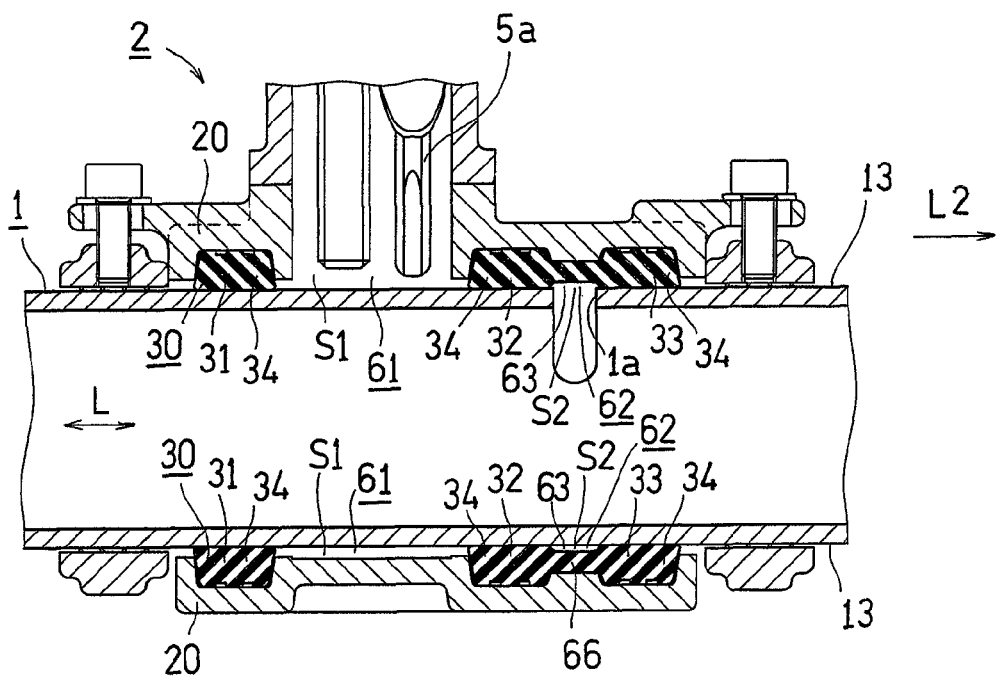

FIGS. 7A and 8B show Embodiment 2.

Figure 7B:
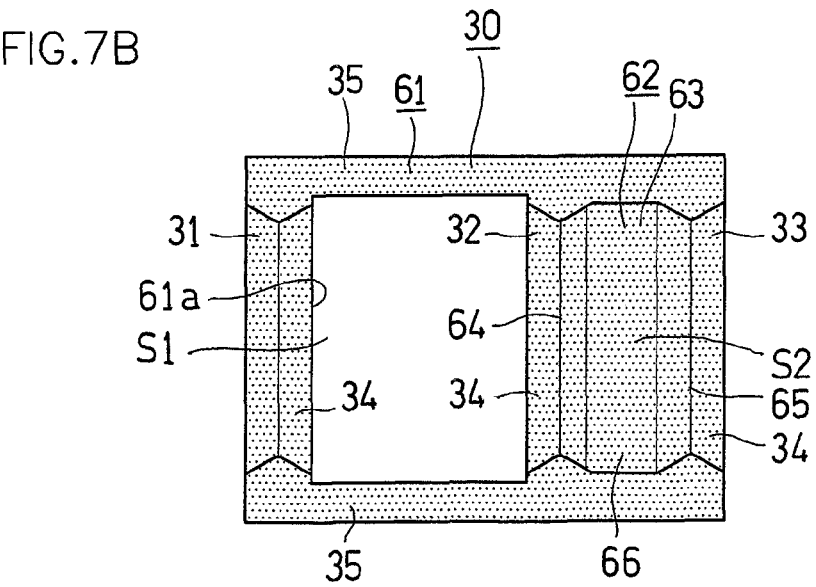
FIG. 7B is a schematic bottom view of a rubber packing.

As shown in FIG. 7B, a first portion 61 of the rubber packing 30, which forms the first sealed area S1, is formed in a lattice pattern having a through hole 61a through which the cutter 3a (FIG. 1) and the gate valve body 5a (FIG. 7A) pass.

As shown in FIGS. 7A and 7B, a second portion 62 of the rubber packing 30 forming the second sealed area S2 is formed in a cylindrical shape surrounding the entire circumference of a portion of the existing pipe 1 that corresponds to the second sealed area S2.

Second Portion 62:

In the second portion 62 of the rubber packing 30, ridge portions 64 and 65 are formed in the second protruding portion 32 and the third protruding portion 33, respectively. Along the ridge portions 64 and 65, the inner periphery surface, which faces the outer periphery surface 13 of the existing pipe 1, protrudes toward the existing pipe 1.

A connecting portion 66, which connects between the pair of ridge portions 64 and 65 and which has a greater inner diameter than the ridge portions 64 and 65, is integrally provided between the second protruding portion 32 and the third protruding portion 33 of the rubber packing 30.

Thus, as shown in FIG. 7B, the second portion 62 is formed in a waffle pattern including a pair of ridge portions 64 and 65 and a pair of straight portions 35 and 35.

As shown in FIG. 7A, the sealing case 20 of Embodiment 2 is provided with a fastening ring 70 in contact with the outer periphery surface 13 of the existing pipe 1.

With such a configuration, as a portion of the existing pipe 1 is airtightly enclosed by the sealing case 20 as shown in FIG. 8A, the first to third protruding portions 31 to 33 deform to closely contact the outer periphery surface 13 of the existing pipe 1, while an inner periphery surface 63 of the connecting portion 66 comes into contact, or close to, the outer periphery surface 13 of the existing pipe 1.

After the boring step by the cutter 3a shown in FIG. 8A, as the sealing case 20 is slid in the first direction L1, the connecting portion 66 serves like a backup ring, thereby preventing the second protruding portion 32 from collapsing in the opening 1a. Therefore, it is unlikely that the second protruding portion 32 gets caught in the opening 1a to become "turned up".

Through such a movement, as shown in FIG. 8B, the sealing case 20 is moved in the first direction L1 so that the second protruding portion 32 and the third protruding portion 33 interpose (bridge) the opening 1a therebetween, with the opening 1a of the existing pipe 1 covered by the second portion 62.

When the sealing case 20 is moved in the second direction L2, the second protruding portion 32 is prevented from collapsing in the opening 1a because the second protruding portion 32 is continuous with the third protruding portion 33 via the connecting portion 66 therebetween. This makes it easier for the second protruding portion 32 to move over the opening 1a.

Otherwise, the configuration is similar to that of Embodiment 1, and like elements are denoted by like reference numerals and will not be further described below.

In Embodiment 2, the second portion 62 forming the second sealed area S2 may be formed in a cylindrical shape that is obtained by combining together two semi-cylindrical rubber packings without the protruding portions 32 and 33. In such a case, the entire inner periphery surface of the second portion 62 is pressed against the outer periphery surface of the existing pipe.

While preferred embodiments have been described above with reference to the drawings, various obvious changes and modifications will readily occur to those skilled in the art upon reading the present specification.

While the sealing case for enclosing the existing pipe is divided into two pieces, i.e., the first and second separate cases, in the embodiments described above, it may be divided into three or more pieces.

The case for enclosing the existing pipe may be a cast product or may be formed by a steel plate. Where it is formed by a steel plate, first and second separate cases, being tentatively assembled together, may be welded together so that the two separate cases are integrated together.

The shape of a hole to be bored is not limited to an arc shape, but may be a circular shape. A circular hole may be formed by a hole saw well known in the art.

Thus, such changes and modifications are deemed to fall within the scope of the present invention, which is defined by the appended claims.

INDUSTRIAL APPLICABILITY

The flow-undisrupted apparatus and the flow-undisrupted process of the present invention can be used for inserting a gate valve body into a line of an existing pipe of water, gas, etc., to disrupt the flow of the fluid with the inserted gate valve body.

DESCRIPTION OF THE REFERENCE NUMERALS

1: Existing pipe
2: Flow-undisrupted apparatus
3a: Cutter
12: Pipe wall
20: Sealing case
21: First separate case
23: Branch hole
28: Flange
30: Rubber packing
L: Pipe axis direction
L1: First direction
L2: Second direction
R: Circumferential direction
S1: First sealed area
S2: Second sealed area

The invention claimed is:

1. A flow-undisrupted process using a flow-undisrupted apparatus to which a boring machine including a cutter for boring a portion of a pipe wall of an existing pipe to form an opening in the pipe wall is attached, the flow-undisrupted apparatus allowing the boring machine to be removed therefrom after the opening is formed, the flow-undisrupted apparatus comprising:
  a sealing case including a plurality of separate cases separated from one another in a circumferential direction of the existing pipe for enclosing a portion of the existing pipe, and a branch-shaped branch pipe portion formed in a first separate case of the plurality of separate cases and having a branch hole extending in a radial direction of the existing pipe; and
  a rubber packing for sealing a gap between the sealing case and the existing pipe, wherein:
  the branch pipe portion of the first separate case is provided with a flange for allowing for attachment and removal of the boring machine;
  the sealing case is capable of reciprocating in a pipe axis direction of the existing pipe; and
  the rubber packing forms:
    a first sealed area surrounding a portion of the sealing case where the branch hole is provided for sealing a gap between the sealing case and the existing pipe around the branch hole; and
    a second sealed area for temporarily shutting the opening bored by the cutter, the second sealed area being adjacent to the first sealed area, sealed against the first sealed area, and displaced from the first sealed area in the pipe axis direction, the flow-undisrupted apparatus further comprising:
a gate valve body being intruded into an inside of the existing pipe through the opening formed in the pipe wall so as to disrupt a flow of a fluid through the existing pipe; and
a valve cover accommodating the gate valve body therein, the valve cover being coupled to the first separate case via the flange instead of the boring machine,
the flow-undisrupted process comprising an assembly step, a boring step, a first movement step, a replacement step, and a second movement step, wherein:
the assembly step is a step of airtightly enclosing the portion of the existing pipe by the sealing case and attaching the boring machine to the flange of the first separate case without providing an operation valve;
the boring step is a step in which the cutter passes through the branch hole to form the opening in the portion of the existing pipe;
the first movement step is a step of moving the sealing case in a first direction of the pipe axis direction after the boring step so that the second sealed area covers the opening without the first sealed area covering the opening;
the replacement step is a step of removing the boring machine from the flange together with the cutter after the first movement step, and attaching the valve cover accommodating the gate valve body therein to the flange instead of the boring machine; and
the second movement step is a step of moving the sealing case in a second direction, opposite to the first direction, after the replacement step to such a position that allows the gate valve body to be intruded into the opening.

* * * * *